United States Patent
Davis

[15] 3,692,181
[45] Sept. 19, 1972

[54] NOVEL CLAMPING DEVICE FOR SECTORS OF A ROTARY DISC FILTER

[72] Inventor: Steven S. Davis, Bountiful, Utah 84010

[73] Assignee: Envirotech Corporation, Salt Lake City, Utah

[22] Filed: March 4, 1971

[21] Appl. No.: 120,888

[52] U.S. Cl. ............210/331, 210/347, 210/486
[51] Int. Cl. ...........................................B01d 33/26
[58] Field of Search..............210/232, 486, 331, 347

[56] References Cited

UNITED STATES PATENTS 2,781,133   2/1957   Thompson..............210/347 X

Primary Examiner—Frank A. Spear, Jr.
Attorney—Robert R. Finch, Richard F. Bojanowski and William S. Britt

[57] ABSTRACT

An improved clamping device for securing a filter sector to the central barrel of a rotary disc filter has been invented. The clamping device features a pair of opposed locking arms each interconnecting at one end to a pair of radial rods extending from said filter barrel. The other ends of the locking arms interconnect with a channel-shaped sector clamp. The upper surface of the channel-shaped sector clamp has a pair of fulcrum blocks for contact with each of the locking arms which when forcibly deflected over the fulcrum block causes an inward radial force which forces the channel-shaped clamp against the sector and further forces the sector in toward the central barrel, thereby holding the filter section firmly in position.

15 Claims, 7 Drawing Figures

PATENTED SEP 19 1972

3,692,181

INVENTOR.
STEVEN S. DAVIS

BY William S. Britt
ATTORNEY

NOVEL CLAMPING DEVICE FOR SECTORS OF A ROTARY DISC FILTER

BACKGROUND OF THE INVENTION

Rotary vacuum disc filters are generally constructed from a plurality of preshaped filter sectors positioned side-by-side. Each sector fits into a central barrel or horizontal shaft through which vacuum is applied. When the filter is submerged in a slurry, filtrate is drawn through a filter medium covering each sector forming a filter cake thereon. The sectors are generally held in place by a clamp such as that illustrated in FIG. 1. The clamps are held firm by nuts threaded on the outer-end of radial rods.

Since rotary disc filters are submerged for a portion of each revolution in a liquid media, corrosion of radial rods is not uncommon, thereby rendering removal of a filter sector difficult. If power tools or excessive force are used to loosen corroded parts, the radial rods may be damaged or the barrel threads may be stripped, thereby making filter sector removal difficult and replacement costly.

OBJECTS OF THE INVENTION

It is an object of this invention to provide clamping device for use on a rotary disc filter, the operation of said clamping device being substantially unaffected by corrosion.

Another object of the invention is to provide a clamping device which is readily assembled and disassembled, and which provides a positive locking action.

Still another object of the invention is to provide a clamping device which is capable of holding sectors of irregular length in alignment with each other.

DESCRIPTION OF THE INVENTION

The above and other objects are achieved by the clamping device of this invention which secures a filter sector to the central barrel of a rotary disc filter having fixed radial rods extending from said central barrel. The clamping device comprises an elongated locking arm which interconnects at least one radial rod with an elongated channel-shaped sector clamp, fulcrum means for contacting said locking arm to transfer radial forces to said elongated channel-shaped sector clamp, and locking means for securing a free end of said locking arm, said locking means adapted to hold said locking arm in a state of stress to provide a substantially inward radial force acting on said fulcrum means and an outward radial force acting on said radial rod.

Further understanding of the invention may be facilitated by reference to the accompanying drawings.

Figure 1:
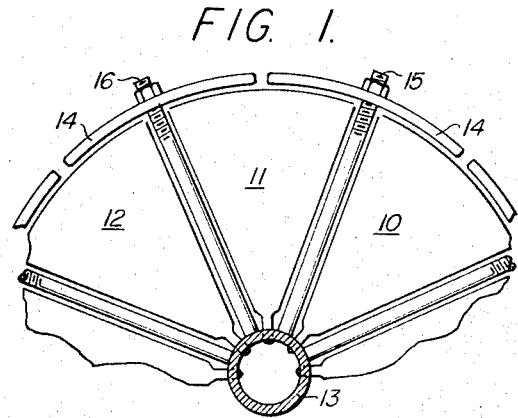
FIG. 1 is a partial, elevational view of a sectional, rotary disc filter of the prior art having conventional clamping means for the filter sectors.

In FIG. 1 there is illustrated a partial view of a segmented or sectional rotary disc filter showing the filter sectors 10, 11 and 12 inserted through the periphery of a hollow ported central barrel 13. The filter sectors frequently comprise a frame which is covered with a filter bag or filter media to form a hollow member. As the filter sectors become immersed in a liquid media such as a slurry, vacuum applied through the central barrel 13 causes a negative pressure in the interior of the filter sector, causing liquid to pass through the filter media into the interior of the filter sector and through the central barrel to a vacuum receiver. Solids material present in a slurry are collected on the filter media as a filter cake.

The filter sectors are held in place by conventional sector clamps 14 held in place against the periphery of the filter sector by nuts threaded on a radial rod 15 which is secured to the central barrel 13. In this conventional construction the nuts frequently become corroded on the radial rod thereby making it very difficult to remove the sector clamp 14. Also, utilization of this type of clamping device renders it necessary to remove the bolts from a pair of adjacent radial rods such as rods 15 and 16 in order to remove a single filter sector placed therebetween, such as sector 11.

Figure 2:
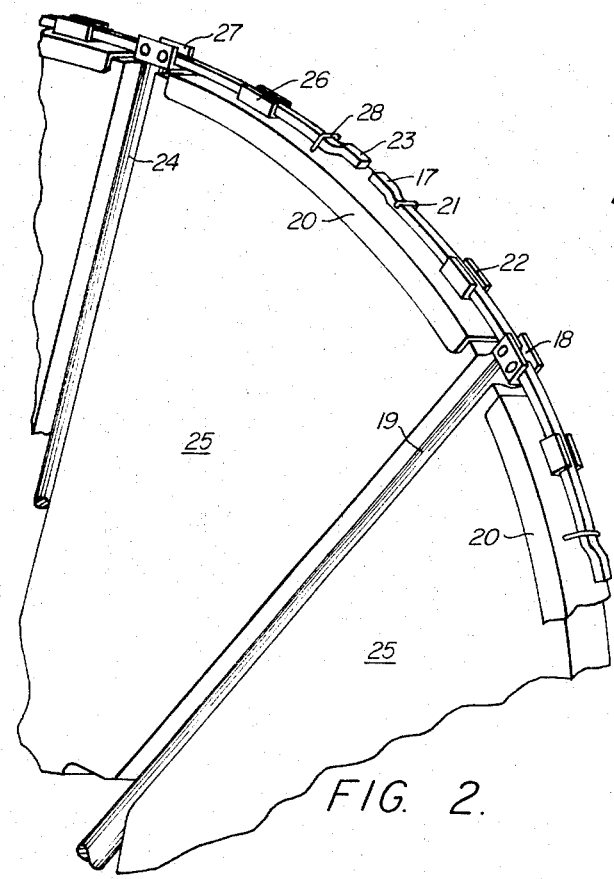
FIG. 2 is a partial, perspective view of a sectional, rotary disc filter wherein stressed locking arms hold the filter sectors in place.

FIG. 2 illustrates the novel clamping means of this invention wherein a locking arm 17 is pivotally attached by pin means 18 to a radial rod 19 to interconnect said radial rod and a sector clamp 20 through locking means 21 and fulcrum and guide means 22. A pair of locking arms such as locking arm 17 and arm 23 pivotally attached to adjacent radial rods 19 and 24 can exert an inward, radial force on a filter sector 25 whenever both locking arms are locked in place. The locking arms are adapted to accept displacement at the ends thereof when a force is applied thereto, for example, locking arm 23 should be sufficiently resilient to slip under locking hook 28 with relative ease yet exert a radial force sufficient to hold a filter sector in locked position.

The clamping effect on filter sector 25 is accomplished by a pair of locking arms 17 and 23 in FIG. 2 whenever the fulcrum means of guides 22 and 26 lie respectively above the plane which contains pivot points 18 and locking hook 21 on the right side and the plane containing pivot point 27 and locking hook 28 on the left side. The closer guide members 22 and 26 are to the pivot points 18 and 27, respectively, the greater is the force which can be applied to the filter sector inasmuch as greater leverage can be exerted.

A resilient base may be included in guides 22 and 26 as bearing members for the locking arms. The use of hard rubber or other resilient material tends to promote application of a uniform force to the base of the filter sector which is in contact generally with a resilient O-ring seated in the central barrel of the filter. This also tends to prevent an excessive force being applied to resilient O-ring at the base of the member and tends to prevent imbalanced forces existing between the locking arms.

Figure 3:
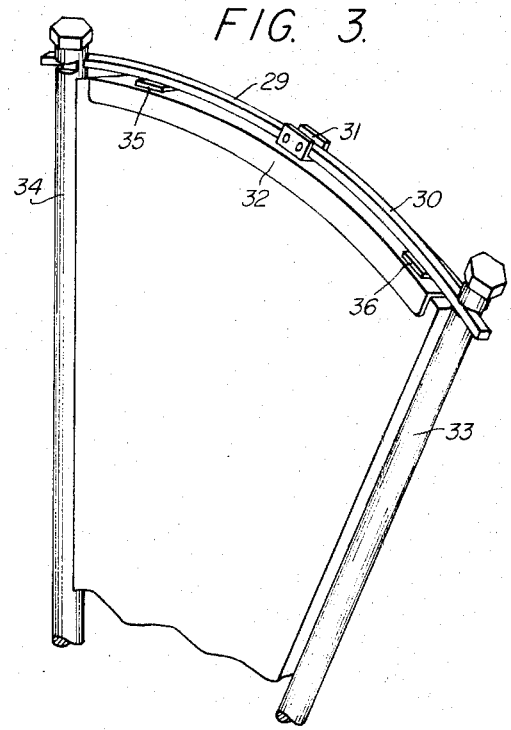
FIG. 3 is a perspective view of a rotary disc filter sector being held in place between a pair of adjacent radial rods by a pair of locking arms.
Figure 4:
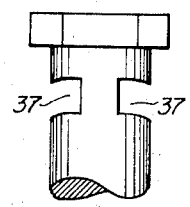
FIG. 4 is a partial elevational view of a notched radial rod.

FIG. 3 is a partial perspective view of an alternative embodiment to that illustrated in FIG. 2. The locking arms 29 and 30 are pivotally secured to a support member 31 attached to a sector clamp 32. The free ends of the locking arms 29 and 30 are locked in slots or other locking means which may be formed as part of radial rods 33 and 34. In FIG. 3, raised fulcrum means 35 and 36 are illustrated without guide means. The raised fulcrum means may be small pads of hard rubber or other resilient material or metal or other rigid material. The slotted radial rod may have a structure such as depicted in FIG. 4 wherein a slot 37 is cut in one surface of the rod transversely to the longitudinal axis of said rod. The slot extends inwardly and upwardly towards the center axis of the rod for a sufficient distance to accommodate the locking arm so that it does not substantially protrude therefrom.

Figure 5:
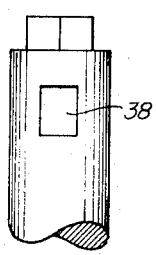
FIG. 5 is a partial, elevational view of a radial rod having a transverse opening.

FIG. 5 is a partial elevational view of a radial rod having a central hole passing laterally through the rod. Radial rods of this type could be used in the system illustrated in FIG. 2 inasmuch as the locking arms would not be fixed to the radial rod by pins or other means. An end of the locking arm may be inserted in the cavity 38 and locked in place on the sector clamp. When a pair of locking arms are locked on the same sector clamp then outward forces exerted on the ends of the locking arms in contact with the radial rods will hold the locking arms in place. Thus, the locking arms can be held in the radial rods by outward radial forces exerted on the ends of the locking arms in contact with the radial rods.

A radial rod of the type illustrated in FIGS. 4 and 5 may be utilized with a single locking arm long enough to engage the cavities of two adjacent radial rods. A single elongated locking arm of this type may be used in conjunction with a bracket of the type illustrated in FIG. 6. A straight, elongated rod engaging one radial rod when forced over the sector clamp and engaged in the next adjacent radial rod forces the sector clamp towards the central barrel of a rotary disc filter. The spring like rod could contact a pair of fulcrum means such as shown in FIG. 3 or a single fulcrum means near the midpoint of the sector clamp. The bracket of FIG. 6 can be used in conjunction with a single locking arm to maintain the arm in position, i.e. prevent lateral or vertical displacement by securing the arm between opposed bracket legs 39 and inserting a pin through a pair of opposed holes 40.

Figure 6:
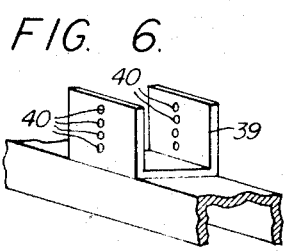
FIG. 6 is a perspective view of locking means attached to the central portion of a channel-shaped sector clamp.

Another manner of using a single straight elongated rod with radial rods shown in FIGS. 5 and 6 is placing the center of the rod in the radial rod slot and displacing opposite ends upward and bringing them in contact with fulcrum means of adjacent sector clamps. The stressed rod places a downward force on each sector clamp. A bracket such as that shown in FIG. 6 is preferably utilized with such a locking system to prevent accidental vertical or lateral displacement of the ends of an arm.

Figure 7:
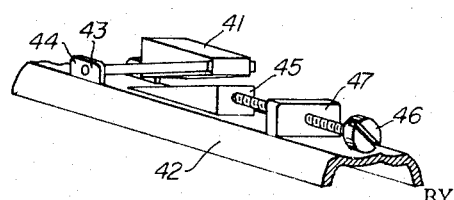
FIG. 7 is a perspective view of an adjustable fulcrum means attached to a channel-shaped sector clamp.

FIG. 7 is an illustration of adjustable fulcrum means with a bearing pad 41 hinged to a sector clamp 42 by a pin 43 passing through vertical lugs 44. The vertical height of the bearing pad 41 is adjusted by repositioning of wedge 45 whose position on the sector clamp 42 is determined by set screw 46 threaded through vertical lug 47. By moving the wedge 45 in direction of the pin 43 the elevation of the bearing pad 41 is increased. By moving the wedge away from pin 43 the elevation of bearing pad 41 is decreased. The adjustable fulcrum means provides means for adjusting the amount of force applied to a sector clamp by a locking arm of a given length and cross-sectional dimensions wherein the ends of the locking arm are maintained in constant relation to the sector.

The amount of force applied to the sector may also be adjusted by having an adjustable locking hook. Whenever the end of the locking arm is secured to a radial rod, the free end of the locking arm may be displaced varying distances towards the central barrel of the rotary disc filter thereby applying varying forces to the sector. The free end of the locking arm may be maintained in any position by utilization of a bracket similar to that illustrated in FIG. 6 wherein a series of vertical holes are provided so that the free ends may be locked at various positions on the sector clamp by the use of pins passing through said holes.

Although the invention has been described hereinabove by reference to several specific embodiments, it is to be understood that the invention is not to be limited solely thereto, but to include all the variations and modifications falling within the scope of the appended claims.

I claim:

1. A clamping device for securing a filter sector to a central barrel of a rotary disc filter having fixed radial rods extending from said central barrel comprising:
  a. an elongated locking arm adapted to interconnect at least one radial rod and to overlie a sector holding means,
  b. a sector holding means adapted to be positioned along the peripheral edge of said filter sector and beneath said elongated locking arm,
  c. fulcrum means on said sector holding means for contacting said locking arm and for transferring a radial force to said sector holding means,
  d. locking means for securing said locking arm and exerting a stress thereon to cause a substantial inward radial force to be exerted on said fulcrum means and an outward radial force to be exerted on said radial rod when said locking arm interconnects said radial rod and said sector holding means.

2. The clamping device of claim 1 which includes a guide means for aligning said sector holding means with said locking arm.

3. The clamping device of claim 1 wherein said elongated locking arm is pivotally secured to a radial rod.

4. The clamping device of claim 1 wherein said fulcrum means is a raised platform attached to said sector holding means and includes a guide means.

5. The clamping device of claim 1 wherein the sector holding means is an elongated channel shaped member contoured to encircle the peripheral edge of said filter sector.

6. The clamping device of claim 5 wherein said locking means comprises a hook-like structure standing on the top surface of a channel shaped sector clamp.

7. The clamping device of claim 1 wherein said locking means secures the free ends of said locking arms to said sector holding means.

8. The clamping device of claim 1 wherein said locking means secures a free end of said locking arm to a radial rod.

9. The clamping device of claim 8 wherein said elongated locking arm is pivotally secured to an elongated channel shaped sector holding means.

10. The clamping device of claim 1 wherein said fulcrum means is adjustable to vary radial force.

11. The clamping device of claim 10 wherein said adjustable fulcrum means comprises a bearing pad pivotally attached at one end to a channel shaped sector clamp, wedge-shaped adjustment means placed between said bearing pad and the top surface of said sector clamp and screw means for positioning said wedge-shaped adjustment means.

12. The clamping device of claim 1 wherein at least one elongated locking arm is pivotally attached to said sector holding means which overrides the peripheral surface of a filter sector.

13. The clamping device of claim 12 wherein said locking means is a part of said radial rod.

14. The clamping device of claim 1 wherein a pair of elongated locking arms are pivotally attached to a single sector holding means.

15. The clamping device of claim 1 wherein a single elongated locking arm interconnects a pair of adjacent radial rods to secure in place a single filter sector and positioned between said radial rods by contacting a single sector holding means.

* * * * *